Sept. 4, 1945. W. B. BOICE ET AL 2,384,364
BAND SAW
Original Filed July 11, 1941   3 Sheets-Sheet 1

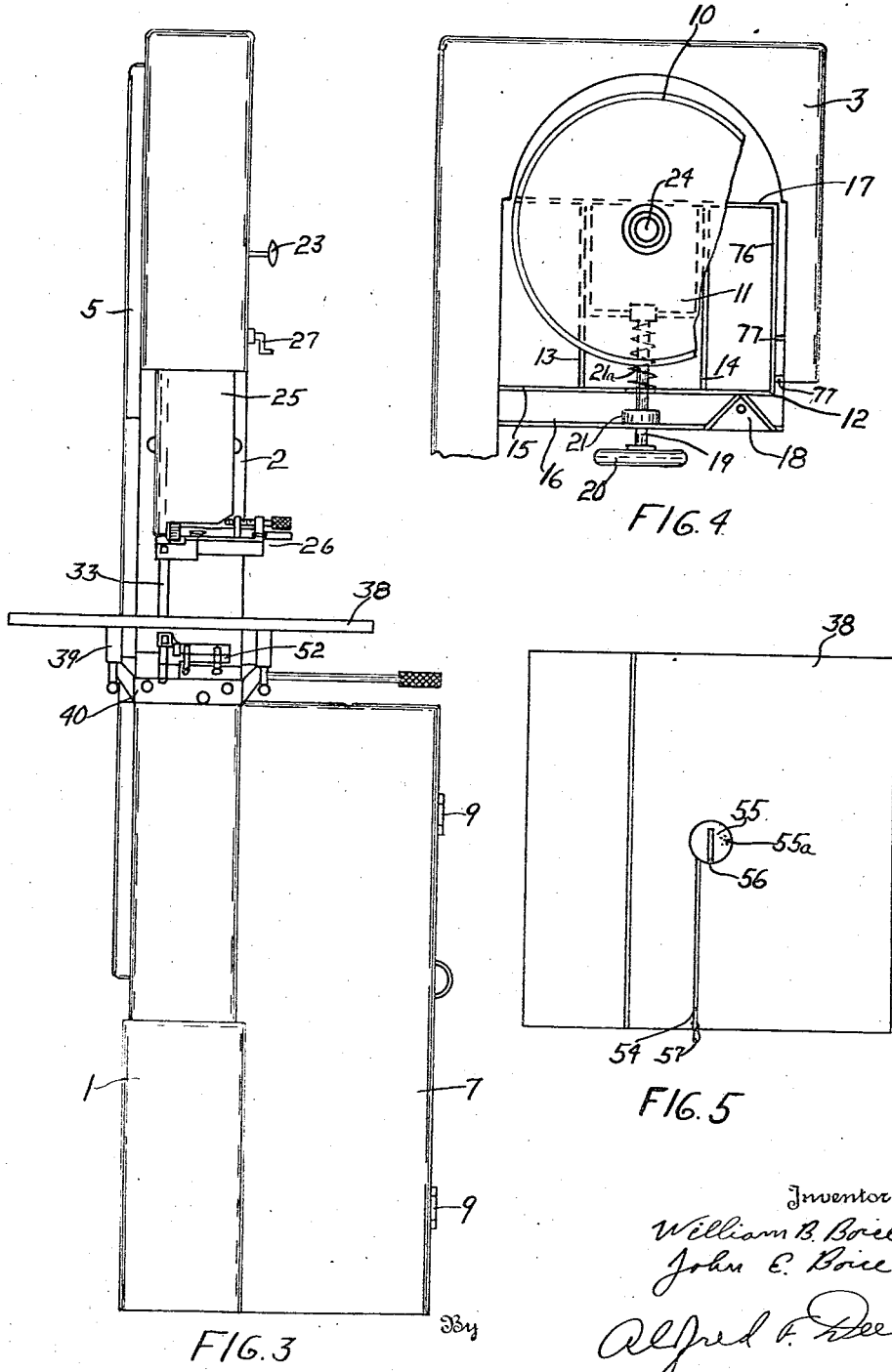

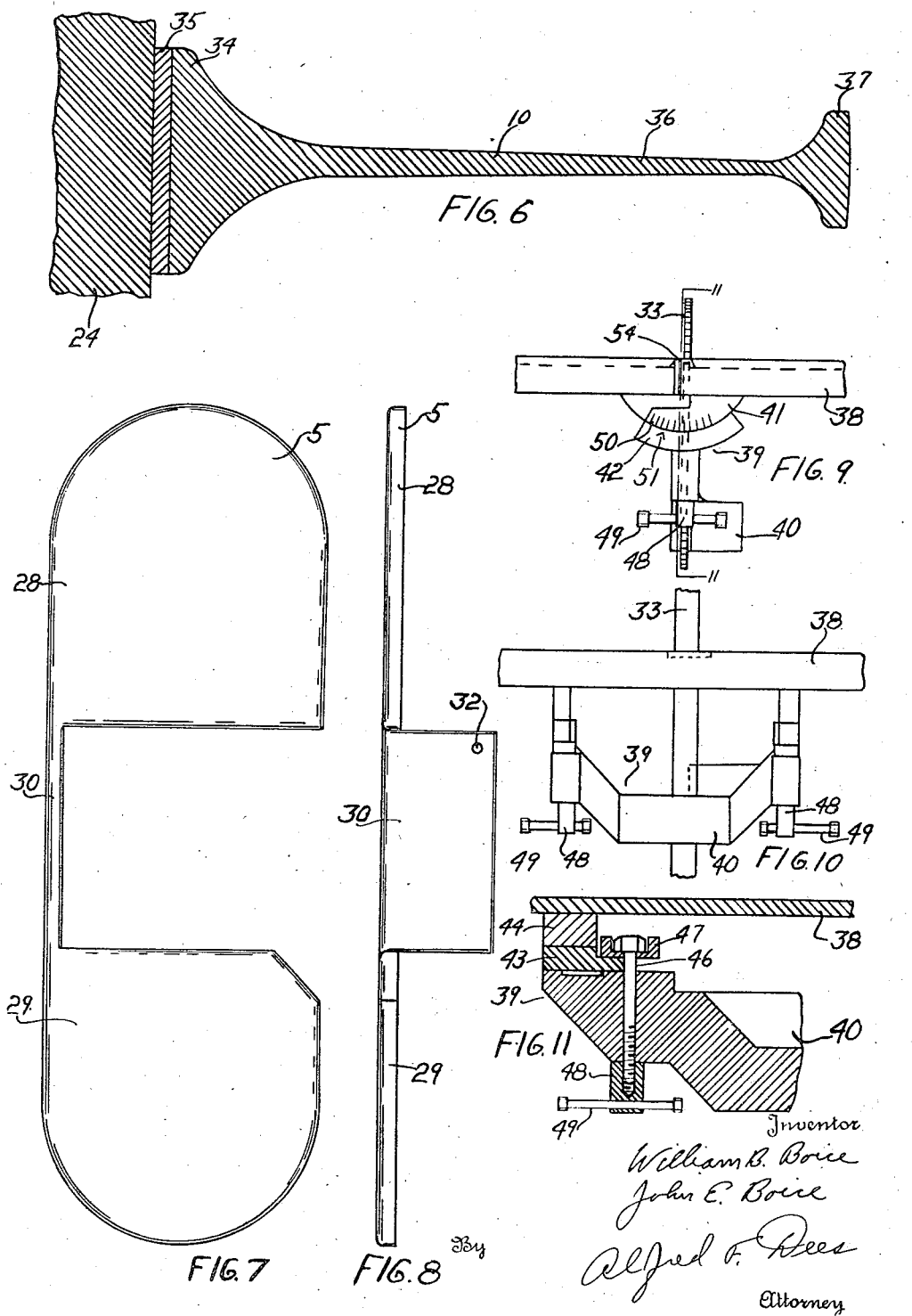

Patented Sept. 4, 1945

2,384,364

UNITED STATES PATENT OFFICE 2,384,364

BAND SAW

William B. Boice and John E. Boice, Toledo, Ohio

Original application July 11, 1941, Serial No. 402,014. Divided and this application September 15, 1943, Serial No. 502,713

2 Claims. (Cl. 143—132)

This invention relates to band saws and in its more specific aspects relates to an improved saw guard and saw frame arrangement, drive and table arrangement each of which parts separately and in combination produce a more efficient and effective machine organization.

The object of this invention is to provide a tiltable saw table that is quickly adjustable and provides a simplified trunnion affording a common support for a lower saw guide as well as a simple effective means for tilting the table.

Another object of the invention is to provide a trunnion mounted saw table in which the saw passes between the trunnions and is guided in the table by an element having a slot internally offset from the slot provided in the table.

A still further object of the invention is to reduce the number of parts in constructing the table trunnions.

Another and further object of the invention is to provide means in a trunnion structure for securely locking the parts in adjusted position that is simple in construction and more effective in its operation by reason of its simplified organization.

Another and still further object of the invention is to provide trunnion structures whose axis of rotation lies in the same plane as the band saw.

Other and still further objects of the invention are to increase the speed of adjustment, simplify design, decrease weight and decrease the number of parts that are subject to wear in the trunnion organization.

Other and further objects of the invention will occur to those skilled in the arts to which this invention pertains as the description proceeds which taken in connection with the accompanying drawings sets forth a preferred embodiment of the invention but such disclosure is not to be construed as a limitation of the invention which is limited only by the appended claims and any and all modifications, alterations and variations of structure coming within the spirit and scope thereof are deemed to be included herein.

In the drawings:

Fig. 3 shows an elevational view of the right hand side of the machine.

Fig. 4 shows a detail view of the head of the machine with the cover guard removed and one part broken away to show details of construction.

Fig. 5 shows a plan view of the table.

Fig. 6 shows a section view of one of the band saw pulley wheels.

Fig. 7 shows a front view of the guard door.

Fig. 8 shows an edge view of the guard door.

Fig. 9 shows an end elevational view of the trunnion that rotatably supports the table on the band saw head.

Fig. 10 shows a side elevational view thereof.

Fig. 11 shows a section view of the trunnion taken along the line 11—11 of Fig. 9.

Figure 1:
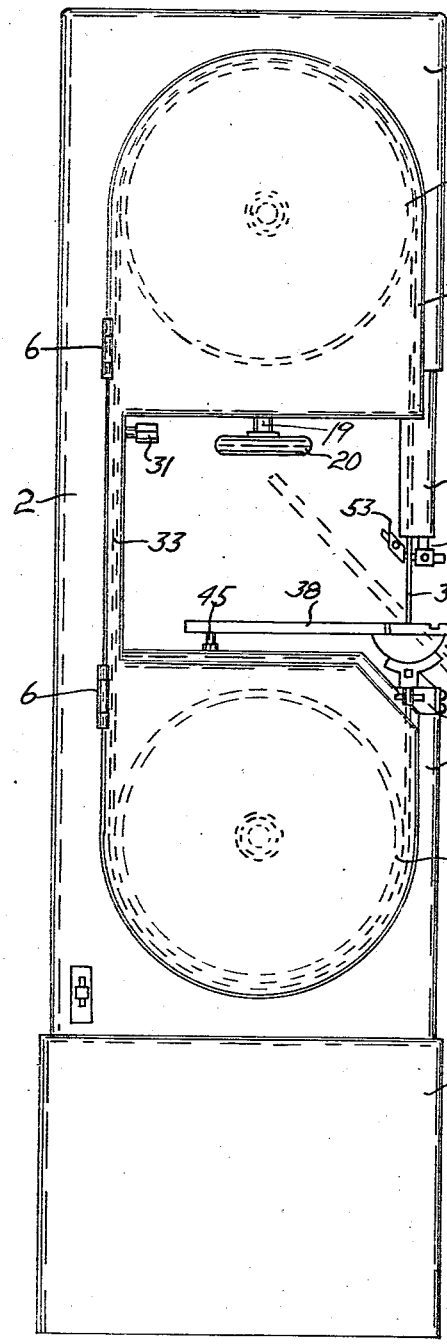
Fig. 1 shows an elevational view of one of the operator's side of the machine.

The machine embodying the above objects comprises a base 1 on which is supported a column like band saw head structure 2 comprising an upper sub-assembly 3 and a lower sub-assembly 4 in which a drive pulley 10' shown in dotted lines is supported. Disposed on one side of the band saw head is a door or saw guard 5 that is hinged to the column at 6, 6 by means of conventional hinges as indicated. On the other side of the machine there is a housing 7 equipped with a door 8 hinged to the housing 7 by hinge means 9, 9. The housing 7 supports and houses a prime mover and a speed changer both of which are of a conventional character and therefore not illustrated or detailed. The door 8 has appropriate latch means to keep it closed and provide access to the prime mover and speed changer described possible at the election of the operator and with comparative ease.

The band saw head has supported therein a pulley or wheel 10 that is rotatably mounted in an appropriate bearing housing 11 slidably mounted in a frame 12 that is fabricated from bar stock and which includes a pair of columns 13 and 14 supported in a U shaped member between portions 15 and 17. See Fig. 4. The portion 16 parallel to 13 and 14 constitutes the base of the U element 12. At one point or portion in proximity to the point at which the saw 33 passes a light receptacle 18 is secured to a portion of the element 16, in which an appropriate illuminating means is arranged. The receptacle 18 is shown as triangular but for better lighting effect its shape may be made parabolic in order that the light generated may be more effectively projected upon a work piece. A screw 19 having a handwheel 20 is threadably associated in bearing housing 11 and has its opposite end appropriately secured and rotatably disposed in the collar 21 whereby to raise and lower the housing 11 and the pulley wheel 10. A spring 21a is concentrically disposed on screw element 19 and acts to tension the band saw blade 33.

Figure 2:
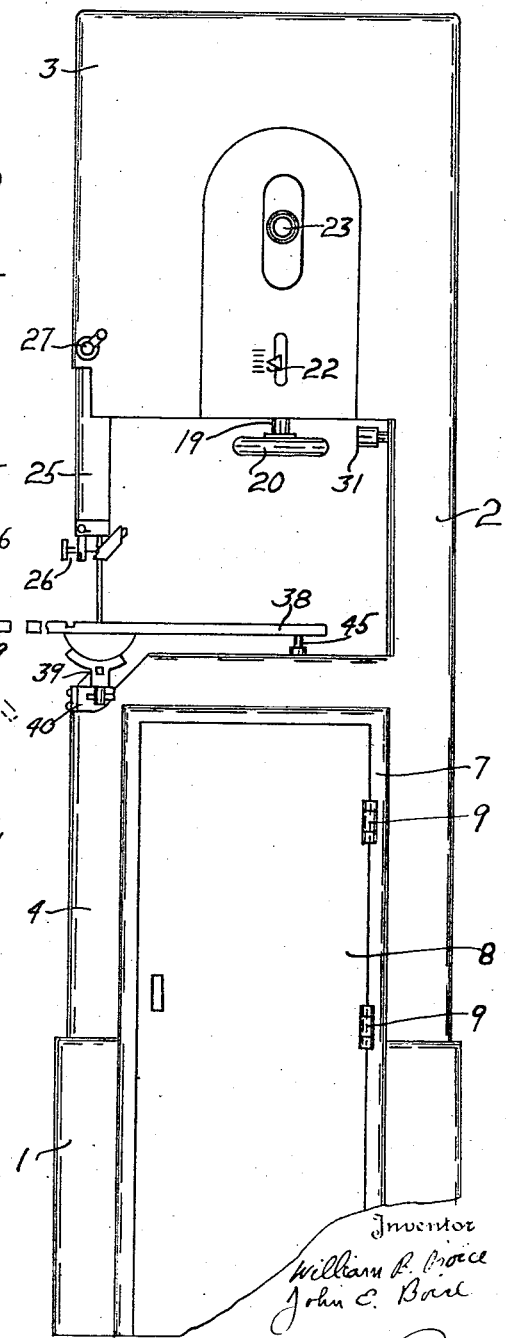
Fig. 2 shows an elevational view looking at the opposite side of the machine.

Hand wheel 20 upon rotation will vertically adjust wheel 10 and tension a band saw mounted thereon. 22 (Fig. 2) indicates a tension gage that informs the operator of the relative tension existing in the band saw 33 and 23 indicates the operating end of a conventional tilting means that is adapted to tilt shaft 24 with respect to the housing 11.

Slidably mounted in the sub-assembly 3 is a vertically adjustable saw guard 25 having mounted on its lower end a saw guide 26 the details of which elements, 25 and 26, are set forth in a companion application Serial Number 396,434 entitled Band saw, filed the 3d day of June 1941. A locking means 27 is provided in band saw head 3 that is adapted to lock guard 25 in any vertically adjusted position, the details of which are more specifically set forth in the above identified application.

The cover 5 previously described is more specifically set forth in Figs. 7 and 8 and comprises two portions 28 and 29 that enclose or cover upper wheel 10 and a lower or drive wheel 10'. The hinges, for convenience, are not shown assembled in the cover but are welded therein. Portions 28 and 29 are connected by a third portion 30 that is disposed at right angles to the planes of portions 28 and 29 or in other words the vertical plane of portion 30 is disposed 90° from the aforementioned planes of portions 28 and 29. The portion 30 is adapted to extend over that part of the column 2 that extends between the head 3 and housing 4 and which guards that portion of the saw that passes upward to the wheel 10 from the lower wheel as illustrated by the dotted lines of the saw in Fig. 1. A screw 31 having a knurled head serves to lock the cover 5 in a closed position, there being an appropriate stud fixed in the column 2 that passes through an aperture 32 arranged in portion 30 of the cover 3.

It is evident from the foregoing that the cover 5 having its angularly disposed portion serves to completely protect the operator on the inactive side of the saw, to prevent any possible contact of the operator with the band saw pulleys and since the adjustable guard 25 and its guide 26 can be brought into immediate proximity of the work piece that the band saw 33 is therefore provided with a maximum guard that leaves only that portion of the saw exposed which is actually operating on a work piece. The above identified application more completely sets forth the co-operation of the guard 25 and guide 26 in relation to the work piece.

A table 38 is pivotally mounted on housing 4 by means of trunnions 39. The trunnions are supported on bracket 40 rigidly secured to the sub-assembly 4 and the upper part of each trunnion is secured to and integrally associated with the table 38. The trunnion comprises two portions 41 and 42, the former of which is fabricated in the form of a segment of a circle comprising a wear-plate 43 which is removably secured to a boss 44 that is made a part of the table 38. See Figs. 9 to 11. Wear-plate 43 is secured to boss 44 by means of a plurality of screws (not shown) or it may be welded thereto if so desired. The bracket 40 comprises an appropriately shaped bar element that has the portion 42 which is complemental to the portion 41 and its wear-plate 43 and rotates on an axis that lies in the upper plane or work supporting surface of the table 38. The portion 42 is made of such a size in the form of a segment of a circle such as to permit a 45° tilting of the work table. A stop mechanism or button 45 may be provided on top of the base element 4 to support the table in a horizontal position.

Means have been provided to lock the table 38 in any angularly adjusted position which comprises a locking screw 46 the head of which is non-rotatably received in a counter-bored washer 47 that in turn rests upon a flange integrally associated with the wear-plate 43. The flange is extended to the immediate proximity of screw 46 disposed in an appropriate aperture formed in or near the extreme ends of the bracket 40. A nut 48 having a handle 49 therethrough is threaded to or on screw 46 and is adapted to tension screw 46 to thereby clamp wear-plate 43 to portion 42 of the bracket 40 in any position to which table 38 may be angularly adjusted. Wear plate 43 has an index 50 arranged thereon that co-operates with the pointer 51 and indicates the degree of tilt of the table with respect to the saw 33.

A lower saw guide 52 is disposed immediately below the table and is supported on a portion of bracket 40, the immediate method of mounting the saw guide on the bracket 40 being disclosed in the application above identified. Attention is at this point invited to the fact that guide 52 (Fig. 1) is inverted from guide 26 and that the portion 53 of saw guide 26 which contains the angularly disposed rigid guide is at 45° to the horizontal and that therefore the lower guide which is identical thereto will have the corresponding element thereof likewise disposed at an angle of 45° to the horizontal and extending in the same direction as the portion 53. Since therefore trunnions 39 are disposed and made such that they will permit a 45° tilting of the table 38 and since guard 25 is capable of vertical adjustment so as to bring guide 26 into immediate proximity to a work piece supported on the table 38 it is apparent that with portion 53 and the complemental portion thereof on the lower guide lying in parallel planes that table 38 may be so arranged that it will lie between the parallel planes just described and afford thereby a complete guarding of the saw in any degree of tilt up to 45° with the same amount of protection as if the table 38 is in a horizontal position.

Therefore the construction just described affords a maximum of protection for any degree of table tilt from the horizontal to 45° therefrom indicated by the dotted line in Fig. 1 to which position the table may be tilted at the election of the operator.

The table 38 is provided with a saw slot 54 and a plate element 55 which is removably and non-rotatably supported in an appropriate bore centrally disposed of the table 38. See Fig. 5. The plate 55 has a slot 56 therein and is provided with a boss or plug element indicated by dotted line 55a that co-operates with an aperture in table 38, the two portions co-operating to prevent any relative rotation of the plate 55 and the table. Attention is invited to the fact that the planes of slots 56 and 54 are in parallel relation to each other and do not lay in the same line or plane. When it is desired to remove from or insert a band saw into the machine it is necessary to remove plate 55 thereby permitting the removal or insertion of a saw blade whereupon plate 55 is replaced such that it assumes the position indicated. Plug 57 is further provided to keep the two halves of the table 38 parallel at the front edge. Attention is further invited to the fact that the slot 54 is disposed relative to the boss 41 and wear-plate 43 such that a bending of the saw around the index element 50, boss 44 and wear-plate 43 is necessary to insert the saw and thereby bring the plane of travel of the saw between the trunnions 39 and in which the center of tilt or rotation of the table 38 as determined by the trunnions 39 will lie in the plane of the saw disposed therebetween. The several trunnion elements are so proportioned as to permit the saw to be manipulated as described. See Fig. 9. This construction enables a direct reading of the degree of tilt of the saw with respect to the table and requires no interpolation. The light that is placed in receptacle 18 is focused on the area defined generally by the plate 55 on table 38 and provides the operator with a constant source of illumination for any degree of tilt of the table.

This application is a division of previous application Serial No. 402,014, filed July 11, 1941, entitled Band saw.

That which is regarded new, novel and useful and which is sought to be protected by Letters Patent of the United States is as follows:

1. In a band saw; a housing having a band saw head; a band saw movably supported therein; a pair of trunnions mounted on said housing; a table tiltably supported on said housing on said trunnions, said trunnions including a wear plate and supporting element secured to said table, said wear plate wider than said wear plate supporting element; means to lock said table on said trunnions including a lock bolt engaging the extended portion of said wear plate; a plate centrally disposed in said table between said trunnions, said saw passing through a slot in said plate; said table having a slot therein parallel to the axis of tilt of said trunnions and table and laterally displaced from the plane of said saw; one of said supporting elements and the wear plate of one of said trunnions supporting said table being in the form of a segment of a circle whose free ends terminate substantially adjacent said table saw slot such that said saw may be passed through said table slot and around the end of said segmental supporting element and wear plate by flexing said saw; said plate being rotatable such that its slot may be brought into registry with said slot in said table to thereby receive said saw; and means to hold said plate in position such that its slot will be substantially in line with the axis of tilt of said table and said saw being in immediate proximity to said axis of tilt.

2. In a band saw; a base element; a table; a pair of trunnions to support said table on said base, said trunnions each including a boss fixed to said table and a wear plate secured to said boss, said wear plate being wider than said boss and constituting a flange and means complemental to the wear plate secured to said base; a lock bolt having a counter-sunk washer thereon engaging said flange with said bolt extending through said complemental means; said table having a saw slot therein arranged parallel to and laterally displaced from the axis of tilt of said table; a plate substantially centrally disposed in said table between said trunnions having a saw slot therein normally in alignment with the axis of tilt of said table, said plate rotatable in order to bring its slot into registry with said table slot; the boss of one of said trunnions being in the form of a segment of a circle whose free end terminates substantially adjacent said table slot; and the band saw when passed through said table flexed about said segmental boss to enable it to pass said boss and to enter said slot in said plate when said plate slot is in registry with said table slot.

WM. B. BOICE.
JOHN E. BOICE.